United States Patent Office 3,280,070
Patented Oct. 18, 1966

3,280,070
STABILIZATION OF UNSTABLE ORGANIC MATERIAL WITH PHOSPHONATES, PHOSPHATES AND/OR THIODIPROPIONATES
Anthony Di Battista, Eastchester, Martin Dexter, Briarcliff Manor, and John D. Spivack, Spring Valley, N.Y., assignors to Geigy Chemical Corporation, Greenburgh, N.Y., a corporation of Delaware
No Drawing. Continuation of application Ser. No. 128,958, Aug. 3, 1961. This application May 5, 1965, Ser. No. 453,507
15 Claims. (Cl. 260—45.85)

This application is a continuation of application, Serial No. 128,958, filed August 3, 1961, which in turn is a continuation-in-part of copending application, Serial No. 127,882, filed July 31, 1961, both of which are now abandoned.

This invention relates to a process for the stabilization of unstable organic material, such as normally solid polymers of propylene against deterioration due, e.g., to molecular oxidation, heat, and/or light. The invention also relates to compositions of said organic material stabilized by said process. The invention further relates to the novel and surprisingly effective combination of stabilizers for said organic material, in particular for normally solid polypropylene.

It is known that organic materials, such as normally solid polymers of propylene are subject to deterioration. It has now been found that surprisingly stable compositions of polypropylene, often with desirable color values, are produced when there is admixed therewith a minor portion of a stabilizer system comprising (a) a stabilizer of the Formula I:

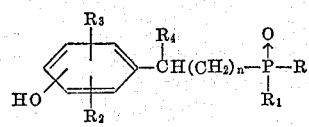

wherein:

R is hydroxyl; alkylphenoxy, preferably having from 7 to 24 carbon atoms; phenyl; phenoxy; alkylthio or alkoxy, preferably alkylthio or alkoxy having from 12 to 24 carbon atoms, examples of useful alkoxy groups represented by R being methoxy, ethoxy, isopropoxy, propoxy, butoxy, secondary butoxy, tertiary butoxy, pentoxy, hexoxy, heptoxy, octyloxy, nonyloxy, decyloxy, undecyloxy, dodecyloxy, tridecyloxy, tetradecyloxy, pentadecyloxy, hexadecyloxy, heptadecyloxy, octadecyloxy, nonadecyloxy, heneicosoxy, docosoxy, tricosoxy tetracosoxy, etc.; in the foregoing examples for R it is understood that oxygen may be usefully substituted by sulfur so that methylthio, ethylthio, isopropylthio, propylthio, butylthio, sec. butylthio, t-butylthio, pentylthio, hexylthio, heptylthio, octylthio, nonylthio, decylthio, undecylthio, dodecylthio, tridecylthio, tetradecylthio, pentadecylthio, hexadecylthio, heptadecylthio, octadecylthio, etc. are also contemplated; examples of useful alkylphenoxy groups represented by R being methylphenoxy, ethylphenoxy, isopropylphenoxy, propylphenoxy, butylphenoxy, dibutylphenoxy, tributylphenoxy, pentylphenoxy, hexylphenoxy, heptylphenoxy, octylphenoxy, nonylphenoxy, decylphenoxy, undecylphenoxy, dodecylphenoxy, tridecylphenoxy, tetradecylphenoxy, pentadecylphenoxy, hexadecylphenoxy, heptadecylphenoxy, octadecylphenoxy, dinonylphenoxy, etc.
$R_1$ is defined the same as R above, except that $R_1$ is *not* phenyl, nor hydroxyl,
$R_2$ and $R_3$ each independently represents alkyl, e.g., alkyl having from 1 to 18 carbon atoms, preferably having from 1 to 6 carbon atoms, especially tertiary butyl; examples of useful alkyl groups being methyl, ethyl, propyl, isopropyl, butyl, secondary butyl, tertiary butyl, pentyl, hexyl, heptyl, octyl, nonyl, decyl, undecyl, dodecyl, tridecyl, tetradecyl, pentadecyl, hexadecyl, heptadecyl, octadecyl, etc.,
$R_4$ represents hydrogen or lower alkyl, e.g., methyl, ethyl, propyl, isopropyl, butyl, secondary butyl, tertiary butyl, pentyl, hexyl, but especially methyl, and
$n$ represents 0, 1, 2 or 3, preferably 0 or 1;

(b) at least one other stabilizer of the Formulas II and III:

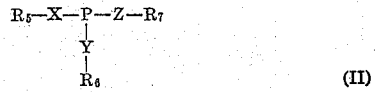

wherein:

X, Y and Z each independently represent divalent oxygen or divalent sulfur,
$R_5$ represents hydrogen, or alkyl—such as hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, etc., preferably iso-octyl, dodecyl, and octadecyl—or alkylphenyl—such as mono- or polyalkylphenyl, e.g., tolyl, dimethylphenyl, trimethylphenyl, tetramethylphenyl, pentamethylphenyl, propylphenyl, dipropylphenyl, tripropylphenyl, tetrapropylphenyl, etc., nonylphenyl, dinonylphenyl, trinonylphenyl, etc., preferably trinonylphenyl, $R_6$ and $R_7$ each indpendently represent alkyl or alkylphenyl, as illustrated for $R_5$ hereinabove;

wherein:

$m$ and $n$ each independently represent a positive integer from 1 to 6, especially 2, and
$R_8$ and $R_9$ each independently represent an alkyl group having from 6 to 24 carbon atoms—especially having 12 carbon atoms—e.g., methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, etc., preferably dodecyl, also referred to herein as "lauryl."

The preferred stabilizer of the Formula II is tri-n-octadecyl phosphite, hereinafter referred to as TOP. Other preferred stabilizers are tri-iso-octylphosphite, trinonylphenylphosphite, trilaurylphosphite, trioctadecylthiophosphite, dilaurylphosphite.

The preferred stabilizer of the Formula I is di-n-octadecyl-3,5-di-t-butyl-4-hydroxybenzylphosphonate.

The preferred stabilizer of the Formula III is dilauryl-β-thio-dipropionate, hereinafter referred to as DLTDP.

The preferred stabilizer system for polypropylene comprises the combination of about 0.1% di-n-octadecyl-3,5-ditertiarybutyl-4-hydroxybenzylphosphonate, about 0.25% DLTDP and 0.25% TOP, all of said percents being by weight, based upon the stabilized polypropylene composition.

The invention particularly relates to stabilization of polypropylene with a stabilizer system employing a compound of the Formula I with either a compound of the Formula II, or a compound of the Formula III. A particularly advantageous stabilizer system comprises at least one compound from each of the three classes of compounds described by the Formulae I, II and III.

Any effective quantity of the combination of compounds of the Formulae I, II and/or III is useful.

Stabilizers of the Formula I are used in the range of about 0.01% to about 1% by weight, preferably from about 0.05% to about 0.25% by weight. Stabilizers of the Formulae II or III are each useful in the range of about 0.01% to about 5% by weight, preferably from about 0.05% to about 1% by weight. (All weight percents are based on total stabilized composition.)

It is an object of the invention to provide stabilized compositions of organic material, especially of polypropylene which is normally solid at room temperature. It is another object of the invention to provide a method of stabilizing said material, especially normally solid polypropylene, by incorporating therein a minor portion, preferably from about 0.1 to about 3% (based on the total composition) of a stabilizing system which comprises a stabilizer of the Formula I and at least one stabilizer selected from the compounds of the Formulae II and III.

Solid polymers of polypropylene find extensive use in various forms of plastic ware. Many different articles of manufacture are produced from polypropylene plastic materials which can be molded and shaped at higher temperatures while remaining relatively rigid at ordinary room temperature. Polypropylene fibers are also useful as covering and coating materials. Such thermoplastic molding or coating agents have high dielectric strength and excellent resistance to water, but unfortunately they are prone to attack by atmospheric oxidation and/or exposure to light, e.g., UV light. Moreover, during processing, such thermoplastic materials are subject to polymeric degradation due the thermal instability. Deterioration caused by one or more of the foregoing may lead to loss, e.g., of dielectric properties, and/or to discoloration, embrittlement or other physical breakdown. Additionally, undesirable discoloration in some uses may occur if the polypropylene is not stabilized with the proper amounts and kinds of stabilizers.

The present invention presents a solution to the problem of how to check these deteriorating agencies so that the solid polypropylene thermoplastic materials may be processed and used in the final product with superior ageing characteristics at both room and elevated temperatures, better processing stability and improved resistance to ultraviolet degradation, and in many cases where desirable, better color values, so that the polypropylene resins employing the stabilizer system of this invention have superior stability characteristics.

While the present stabilizer system employs DLTDP as a basic component, surprisingly, said system goes beyond the expected stabilizing power of DLTDP alone. Compositions comprising polypropylene and DLTDP alone, possess less desirable stability characteristics than polypropylene resins stabilized with the system according to the present invention. Moreover, the superior results obtained in many cases cannot be explained as a mere additive effect.

It is understood that the stabilizer systems of the invention are not necessarily of equivalent potency. The specific stabilizer system most useful to a given unstable material will depend upon several factors for its advantages. Availability and cost of raw materials for the manufacture of the stabilizer and effective inhibitory action of the stabilizer on the unstabilized material, including duration and degree of activity, are among the factors which control the choice of a specific stabilizer system for a specific unstable material which is normally subject to deterioration. Toxicity, color, stability to light and/or heat and solubility are also important factors.

The stabilizers of this invention may be used to stabilize organic material in combination with other additive agents also, such as, e.g., antioxidants, chelating agents, carbon black, plasticizers, lubricity promotors, color stabilizers, heat stabilizers, ultra-violet absorbers, dyes and pigments, fillers, etc.

Some of the individual stabilizer compounds of the invention are known in the chemical art. For example, DLTDP is a known compound. Moreover, the phosphite compounds are also known.

The stabilizer compounds of the Formula I may be prepared in a number of ways.

METHOD 1.—REACTION OF TERTIARY PHOSPHITES WITH ALKYLHYDROXYARYLALKYLENE HALIDES

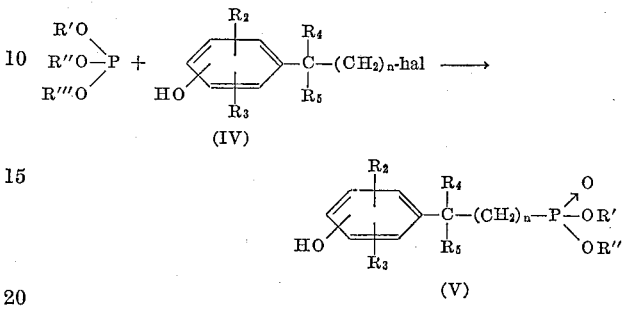

In this first method R', R" and R'" may be the same or different radical, such as phenyl, alkyl, alkylphenyl, or alkylarylalkylene, etc.; $R_2$, $R_3$ and $R_4$ are defined as in Formula I; and $R_5$ is lower alkyl or hydrogen; while $n$ is 0, 1, 2 or 3; and hal is a halogen atom, e.g. Cl.

METHOD 2.—REACTION OF TERTIARY DITHIOPHOSPHITES WITH ALKYLHYDROXYARYLALKYLENE HALIDES

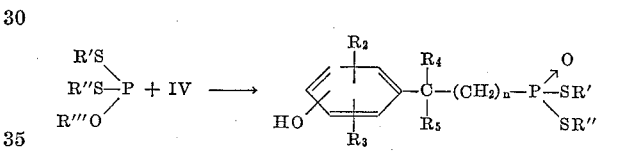

In this second method, the R groups and $n$ are defined as in Method 1 hereinabove.

METHOD 3.—REACTION OF TERTIARY TRITHIOPHOSPHITES WITH ALKYLHYDROXYARYLALKYLENE HALIDES

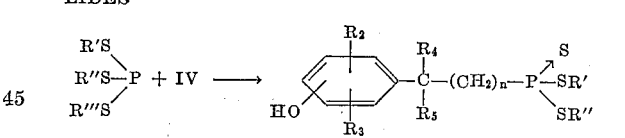

In this third method, the R groups and $n$ are defined as in Method 1 hereinabove.

METHOD 4.—REACTION OF SECONDARY PHOSPHITES WITH ALKYLHYDROXYARYLALKYLENE HALIDES

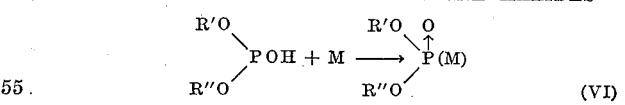
(VI)

where M is alkali or alkaline earth metal

In this fourth method the R groups and $n$ are defined as in Method 1 above; and M is alkali or alkaline earth metal, e.g. sodium. Sulfur may replace all or some of the oxygen atoms in the above equation.

METHOD 5.—REACTION OF SECONDARY HALOPHOSPHATES WITH ALKYLHYDROXYARYLALKYLENE MAGNESIUM HALIDES

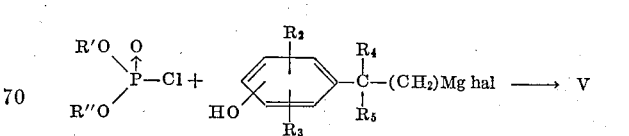

In this fifth method, the R groups, $n$ and hal are defined as in Method 1 hereinabove. Sulfur may replace all or some of the oxygen atoms in the above equation.

METHOD 6.—TRANSESTERIFICATION OF PHOSPHONATE DIESTERS

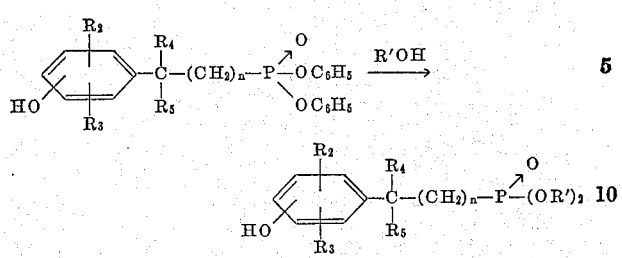

In this sixth method, the R groups and $n$ are defined as in Method 1 hereinabove. Sulfur may replace all or some of the oxygen atoms in the above equation.

METHOD 7.—ESTERIFICATION OF THE PHOSPHONIC ACIDS

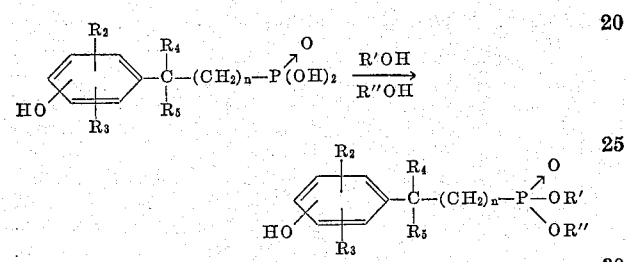

In this seventh method, the R groups and $n$ are defined as in Method 1 hereinabove. Sulfur may replace all or some of the oxygen atoms in the above equation.

METHOD 8.—ESTERIFICATION OF THE PHOSPHONYL HALIDES

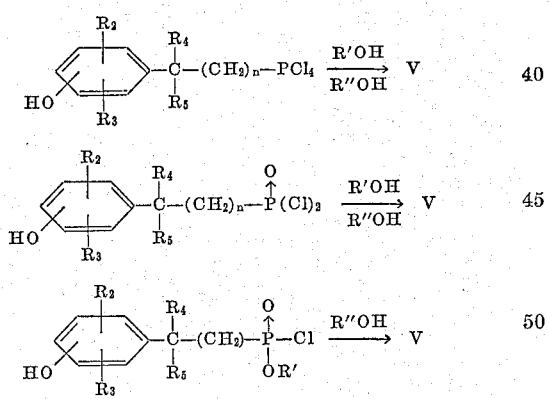

In this eighth method, the R groups and $n$ are defined as in Method 1 hereinabove. Sulfur may replace all or some of the oxygen atoms in the above equation.

METHOD 9.—ACID OR ALKALINE HYDROLYSIS OF PHOSPHONATE DIESTERS

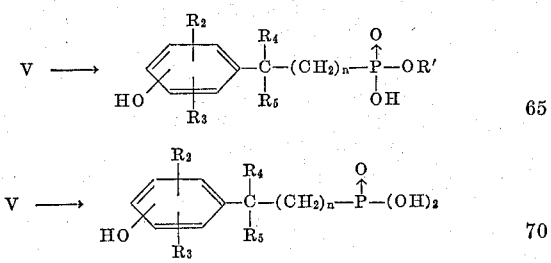

In this ninth method, the R groups and $n$ are defined as in Method 1 hereinabove. Sulfur may replace all or some of the oxygen atoms in the above equation.

METHOD 10.—CONTROLLED OXIDATION OF PHOSPHONITE DIESTERS

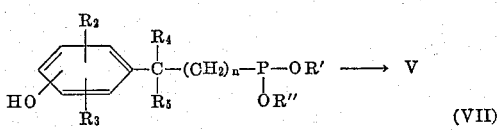

In this tenth method, the R groups and $n$ are defined as in Method 1 hereinabove.

METHOD 11.—THIONATION OF PHOSPHONITE DIESTERS

VII→V

In this eleventh method, the R groups and $n$ are defined as in Method 1 hereinabove. Sulfur may replace all or some of the oxygen atoms in the above equation.

METHOD 12.—SYNTHESIS OF PHOSPHINATES FROM PHOSPHONITES

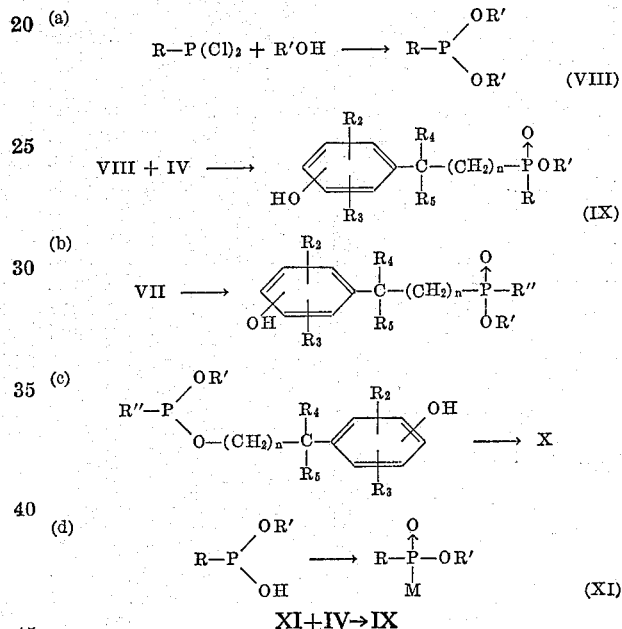

XI+IV→IX

In the foregoing equations, the terms $n$, R′, R″, $R_2$, $R_3$, $R_4$, $R_5$ are defined as in Method 1 except that the term —R— is alkyl or phenyl and sulfur may be substituted for all or some of the oxygen atoms. In Method 12d, M is an alkali or alkaline earth metal such as sodium.

METHOD 13.—PREPARATION OF PHOSPHINATES BY THE GRIGNARD REACTION

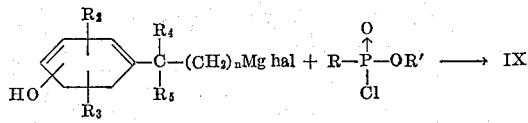

In the foregoing equation, the terms $n$, R′, $R_2$, $R_3$, $R_4$, $R_5$ are defined as in Method 1 except that the term —R— is alkyl or phenyl and hal represents halogen. Sulfur may be substituted for all or some of the oxygen atoms. In Methods 5 and 13 instead of the conventional Grignard compound alkylhydroxyarylalkyl magnesium halide, the corresponding sodium or lithium alkylhydroxyarylalkyl compound may be used.

Any propylene polymer which is normally solid at ordinary room temperature may be stabilized with the system according to the invention. The stabilizer system of the invention may be incorporated into polypropylene during milling, extruding, or any other suitable process. Moreover, said stabilizer system may be advantageously preformed before incorporation into the solid polymer. Alternatively, the individual components of the stabilizer system may be incorporated into the polypropylene separately or in combination with one or several other components.

Further objects and advantages of the invention will be observed from the examples which follow hereinafter. These examples are meant for illustration purposes and are not intended to limit the scope of the invention in any way. Unless otherwise noted in said examples, parts are by weight and the relationship between weight and volume is as that of grams to cubic centimeters. The temperature is in degrees centigrade.

EXAMPLES—PART I: PREPARATION OF INTERMEDIATES

*Example 1.—2,6-Di-t-butyl-4-(β-chloroethyl)phenol*

(A) METHYL-3,5-DI-t-BUTYL-4-HYDROXYPHENYL-ACETATE

Gaseous hydrogen chloride is bubbled through a solution of 108.3 parts of 2,6-di-t-butyl-4-hydroxy benzylcyanide (0.45 mole) dissolved in 700 parts by volume of methanol at −5° over a period of about 1 hour. The reaction mixture is then stirred at −5° to 0° for four hours, at 8° for 1 hour and then allowed to warm to room temperature. 2000 parts of water is gradually added at 20 to 25°. The yellow dispersion is cooled to 10°, the yellow solid filtered and washed free of acid with water. The aqueous wash water yields a little white precipitate which is combined with the main portion of yellow solid. The solid is dispersed in water and let stand for four days at room temperature. The dispersion is heated at 65 to 70° for 1.5 hours; the yellow solid is filtered, washed nearly free of halogen and dried in the vacuum oven at 50° at 100 mm. Hg pressure, yielding 108 parts of methyl-3,5-di-t-butyl-4-hydroxyphenylacetate melting at 80 to 85°. The ester is purified by distillation boiling at 135° at 0.3 mm. Hg pressure. The methyl-3,5-di-t-butyl-4-hydroxyphenylacetate so-obtained melts at 83 to 85°.

(B) 2,6-DI-t-BUTYL-4-(β-HYDROXYETHYL)PHENOL 11 parts of lithium aluminum hydride (0.29 mole) are dispersed in 900 parts by volume of dry diethyl ether in a dry 3-neck flask fitted with a stirrer, dropping funnel, the apparatus being protected from atmospheric moisture by calcium chloride drying tube. The ether is warmed to reflux temperature with stirring, a fine dispersion of lithium aluminum hydride being obtained. 97 parts of methyl-3,5-di-t-butyl-4-hydroxyphenylacetate dissolved in 300 parts by volume of dry diethyl ether is added dropwise so that gentle reflux is maintained, precipitating a gelatinous precipitate. The reaction mixture is then heated under reflux for 4 hours. The reaction mixture is cooled to room temperature and the unreacted lithium aluminum hydride decomposed by the cautious addition of 100 parts by volume of ethylacetate, followed by the cautious addition of 200 parts of water. The reaction mixture is maintained at 20°. The reaction mixture is made acid by 400 parts by volume of 10% by volume of sulfuric acid. The clear supernatant ethereal solution is separated from the aqueous phase and washed with 200 parts by volume of 1 N aqueous sodium hydroxide, and by water, the ether solution being dried over anhydrous sodium sulfate. The crude 2,6-di-t-butyl-4-(β-hydroxyethyl)phenol (85.3 parts) is dissolved in 170 parts by volume of ethanol containing 9.8 parts of potassium hydroxide, the alkaline alcohol solution being heated at reflux for 45 minutes. The cooled reaction mixture is poured into 500 parts of water and stirred. The precipitate product is filtered, the solid being washed with water to remove alkali and dried in the vacuum oven at about 60° at 100 mm. Hg pressure. 68 parts of 2,6-di-t-butyl-4-(β-hydroxyethyl)phenol is thus obtained as a light green powder melting at 90–95°. After recrystallization successively from hexane and a solvent mixture of carbon tetrachloride and petroleum ether, the 2,6-di-t-butyl-4-(β-hydroxyethyl)phenol is obtained as a white crystalline solid melting at 99 to 101°.

(C) 2,6-DI-t-BUTYL-4-(β-CHLOROETHYL)PHENOL 57 parts of 2,6-di-t-butyl-4-(β-hydroxyethyl)phenol (0.23 mole) and 1 part of pyridine are dissolved in 250 parts by volume of dry benzene. 47.5 parts of thionyl chloride (0.26 mole) is added dropwise at 35° over a period of 10 minutes. The reactants are then heated at reflux for 3.25 hours. The cooled benzene solution is decanted from the precipitated pyridine hydrochloride and washed successively with saturated aqueous sodium chloride solution, saturated aqueous sodium bicarbonate solution, saturated aqueous sodium chloride solution and dried over anhydrous magnesium sulfate. After removing the benzene solvent at 15 mm. Hg pressure 62.3 parts of crude 2,6-di-t-butyl-4-(β-chloroethyl)phenol is obtained. The product was distilled at 130 to 147° at 2.6 to 3 mm. Hg and redistilled through a spinning band column boiling at 120° at 0.3 mm. Hg pressure. 2,6-di-t-butyl-4-(β-chloroethyl)phenol is a white solid melting at 66–67°.

*Example 2.—2-t-butyl-4-chloromethyl-6-methylphenol*

Gaseous hydrogen chloride is bubbled through a dispersion of 46.8 parts of paraformaldehyde dispersed in 80 parts by volume of glacial acetic acid at a temperature of 15 to 22° over a period of 25 minutes. The reaction mixture is cooled to −12° and 81.6 parts of 2-methyl-6-t-butylphenol dissolved in 40 parts by volume of glacial acetic acid is added dropwise over a period of 1.5 hours at −9° while a rapid stream of gaseous hydrogen chloride is passed through the reaction mixture. After the addition is over, the reaction mixture is stirred for 30 minutes, and 80 parts by volume of water added at −8°. The lower acetic acid layer is discarded while the upper layer is taken up in 80 parts by volume of benzene. The benzene solution is washed with saturated sodium chloride solution and freed of a small amount of turbidity by centrifugation; then dried over anhydrous magnesium sulfate. The drying agent is removed by filtration and the benzene and residual volatile material by distillation at 0.2 to 2 mm. Hg nitrogen pressure. The residual 2-t-butyl-4-chloromethyl-6-methylphenol (62 parts) is obtained as a viscous brown oil of 87% purity. The product is used as an intermediate as such.

*Example 3.—2,6-di-t-butyl-4-chloromethylphenol*

Gaseous hydrogen chloride is bubbled through a dispersion of 19.5 parts of paraformaldehyde (0.65 mole) in 1000 parts by volume of glacial acetic acid at 15 to 20°. A clear solution results after 20 minutes. 103 parts of 2,6-di-t-butylphenol (0.5 mole) dissolved in 50 parts by volume of glacial acetic acid is added over a period of 5 minutes at 17 to 30°, the introduction of hydrogen chloride being continued. After the addition is complete the reaction mixture is stirred at 25 to 27° for 45 minutes while hydrogen chloride is being introduced. The reaction mixture is poured into a separatory funnel, the lower acetic acid water layer (about 130 parts by volume) being set aside. The upper layer is taken up in 150 parts by volume of benzene and washed successively with saturated sodium chloride solution, saturated sodium bicarbonate solution and 9% sodium bisulfite solution. The benzene layer is finally dried over anhydrous magnesium sulfate. The drying agent is filtered and the clear benzene solution freed of benzene by distillation at 15 to 30 mm. Hg nitrogen pressure. The crude (104 parts) 2,6-di-t-butyl-4-chloromethylphenol is purified by distillation at a vapor temperature of 118 to 121° at 0.8 to 0.9 mm. Hg. The 2,6-di-t-butyl-4-chloromethylphenol so obtained is a yellow oil of 97 to 98% purity.

*Example 4.—2,4-di-t-butyl-6-chloromethylphenol*

Gaseous hydrogen chloride is bubbled through a dispersion of 29.5 parts of paraformaldehyde (equivalent to 0.97 mole of formaldehyde) dispersed in 80 parts by volume of glacial acetic acid at 15 to 20°, a nearly clear solution being obtained within 10 minutes. 83.5 parts of 2,4-di-t-butylphenol dissolved in 40 parts by volume of glacial acetic acid is added dropwise at 25 to 27° over a period of 40 minutes. The reaction mixture is stirred for an additional 45 minutes at 22 to 24°. Gaseous hydrogen chloride is passed through the reaction mixture during the entire addition and stirring periods. The product crystallizes spontaneously, the crystal slurry being separated from the lower acetic acid water. The crystal slurry is then filtered and dried over $P_2O_5$ in a vacuum desiccator at 0.3 mm. Hg pressure, yielding 57.5 parts by 2,4-di-t-butyl-6-chloromethylphenol as white crystals melting at 62–64°. Less pure 2,4-di-t-butyl-6-chloromethylphenol (13 parts) is obtained from the filtrate by dilution with concentrated hydrochloric acid as well as from the acetic water phase by dilution with concentrated hydrochloric acid.

*Example 5.—2,6-di-t-butyl-4-α-chloromethylphenol*

Gaseous hydrogen chloride is bubbled through a solution of 57 parts of acetaldehyde (1.3 moles) in 100 parts by volume of glacial acetic acid at −5 to +10°. After 20 minutes the initial exothermic reaction subsides 103 parts of 2,6-di-t-butylphenol dissolved in 50 parts by volume of glacial acetic acid is added dropwise over a period of 1.5 hours so that the temperature is maintained at 15 to 16°. Stirring is continued at room temperature for 45 minutes. Gaseous hydrogen chloride is passed through the reaction mixture during the addition and subsequent stirring periods. The reaction mixture is poured into a separatory funnel, the lower acetic acid water layer being discarded. The upper layer is taken up in 100 parts by volume of benzene, the benzene solution being washed successively with water, saturated sodium chloride polution and finally dried over anhydrous magnesium sulfate. The benzene solution is filtered, the clear filtrate being freed of benzene and other residual volatile products by distillation from a water bath held at 30° at a nitrogen pressure of 40 mm. Hg. Finally, removal of volatile solvent and traces of acetic acid is effected by distillation at 0.2 mm. Hg pressure. The residual 2,6-di-t-butyl-4-α-chloroethylphenol is obtained as a viscous brown liquid (about 120 parts) of 93% purity. The product is used as such without further purification.

*Example 6.—O-methyl-S,S-di-n-octadecyldithiophosphite*

13.3 parts of methyldichlorophosphite (0.10 mole) is dissolved in 50 parts by volume of n-hexane and added dropwise over a period of 30 minutes at 15 to 20° to a solution of 57.2 parts of n-octadecanethiol (0.20 mole) in 250 parts by volume of n-hexane containing 24.4 parts of dimethylaniline. Since only a small amount of precipitate is visible even after heating the reaction mixture at 60° for 1 hour, 20.2 parts of triethylamine (0.20 mole) is added to the reactants at 40° to 45° over a period of 15 minutes. After removal of the amine hydrochloride by filtration, the hexane solution is washed successively with 5% aqueous hydrochloric acid, water and saturated aqueous sodium bicarbonate. An emulsified phase is extracted with 300 parts by volume of ether. The combined organic solution is dried over anhydrous sodium sulfate. The filtered clear organic layer is concentrated to dryness by distillation at 15 mm. Hg vacuum. The O-methyl-S,S-di-n-octadecyldithiophosphite is obtained as a white waxy solid (58 parts) melting at 38 to 40° C. The product can be recrystallized from isopropanol, the melting point remaining unchanged.

*Example 7.—Methyl-di-p-t-octylphenylphosphite*

20 parts of methyldichlorophosphite (0.15 mole) dissolved in 50 parts by volume of n-hexane is added dropwise at 15 to 20° over a period of 30 minutes to a solution of 61.8 parts of p-t-octylphenol and 36.6 parts of dimethylaniline in 250 parts by volume of n-hexane. A copious white precipitate starts to form at 18°. The reactants are stirred at room temperature for 3.5 hours, the white amine hydrochloride being filtered and set aside after washing with hexane. The combined hexane filtrate and washings are concentrated by distillation of the hexane at 15 mm. Hg pressure. The residual methyl-di-p-t-octyl-phenylphosphite (71 parts) is obtained as a pale lemon viscous oil.

*Example 8.—Di-n-octadecylbenzenephosphonite*

37 parts of benzene dichlorophosphine is added dropwise over a period of 20 minutes at 20 to 33° to a solution of 108.4 parts of n-octadecyl alcohol and 40.4 parts of tirethylamine in 1000 parts by volume of benzene. The reaction mixture is stirred at 27° for 16 hours. The precipitate amine hydrochloride is filtered, the filter cake being washed with benzene. The filtrate and washings are combined and freed of benzene by distillation at 15 mm. Hg pressure. The residual liquid di-n-octadecylbenzenephosphonite (133 parts) slowly solidifies to a pale opalescent waxy solid melting a little above room temperature.

The product can be purified further by dissolving in acetone, filtering off the insoluble precipitate, and recovering the di-n-octadecylbenzenephosphonite as residue by distilling the acetone at 15 mm. Hg pressure.

EXAMPLES—PART II: PREPARATION OF STABILIZERS

*Example 9.—Di-n-octadecyl-(3-t-butyl-4-hydroxy-5-methylbenzyl)-phosphonate*

7.3 parts of 87% 6-t-butyl-4-chloromethyl-2-methylphenol (0.03 mole) and 25.1 parts of trioctadecylphosphite are melted together at 90° for 10 minutes and then heated at 130° for 40 minutes under a nitrogen pressure of 0.3 mm. Hg. The reaction product becomes lighter in color and is then heated at 155° to 180° for 1 hour. 0.5 parts of dimethylaniline is then added and the reaction mixture heated at 190 to 215° at 0.3 mm. Hg pressure, 55 parts of distillate being collected at a vapor pressure of 140 to 151°. The crude product (26 parts) is dissolved in acetone and unreacted starting material, the trioctadecylphosphite removed by crystallization. The acetone filtrate yields white crystals melting at 65–69°. On successive recrystallization from acetone the di-n-octadecyl-(3-t-butyl-4-hydroxy-5-methylbenzyl) - phosphonate is obtained as white crystals melting at 69–71°.

*Example 10.—Di-n-octadecyl-1-(3',5'-di-t-butyl-4'-hydroxyphenyl)-ethanephosphonate*

7.2 parts of 93% 2,6-di-t-butyl-4-α-chloroethylphenol (0.025 mole) and 21 parts of trioctadecylphosphite are heated together at 130° for 2 hours at nitrogen pressure of 40 mm. Hg. The by-product octadecyl chloride is then distilled at a vapor temperature of 130 to 135° at 0.15 mm. Hg pressure while maintaining the still pot at 185 to 195°. The crude product (21.5 parts) is dissolved in about 60 parts by volume of hexane and cooled in an ice-water bath, the insoluble precipitate being undesired by-product. The hexane filtrate is evaporated to dryness, the residual oil (9.9 parts) is triturated five times with a total of 70 parts by volume of acetonitrile. Successive recrystallization of the triturated residue from acetone yields the di-n-octadecyl-1-(3',5'-di-t-butyl-4'-hydroxyphenyl)-ethanephosphonate as white crystals melting at 72–74°.

*Example 11.—Di-n-octadecyl-3,5-di-t-butyl-2-hydroxybenzylphosphonate*

21 parts of trioctadecylphosphite (0.025 mole) and 6.4 parts of 2,4-di-t-butyl-6-chloromethylphenol (0.025 mole) are heated together at 120 to 130° for 6 hours under a nitrogen pressure of 60 mm. Hg. The crude product (26 parts) was triturated with acetone and the precipitate recrystallized from acetone. The di-n-octadecyl-3,5-di-t-butyl-2-hydroxybenzylphosphonate is thus obtained as white crystals melting at 51°.

*Example 12.—Di-n-dodecyl-2-(3',5'-di-t-butyl-4'-hydroxyphenyl)ethane phosphonate*

17.5 parts of trilaurylphosphite (0.03 mole) and 8.1 parts of 2,6-di-t-butyl-4-chloromethylphenol are melted together under nitrogen at 70 to 80° to lemon yellow oil. The charge is then heated at 120 to 150° at 0.2 to 0.4 mm. Hg pressure when the color of the reaction product is almost colorless over a period of two hours. The pressure is then increased to 20 mm. Hg and the reaction then heated for 30 minutes at 170°, 30 minutes at 200° and 30 minutes at 230°. The pressure is then increased to 50 mm. Hg and the temperature to 260° and held under these conditions for 2 hours. 5.5 parts of dodecylchloride is then distilled at a vapor temperature of 175° at 35 mm. Hg pressure. The di-n-dodecyl-2-(3',5'-di-t-butyl-4'-hydroxyphenyl)ethane phosphonate is obtained as a light yellow oil weighing 17 parts. The di-n-dodecyl-2-(3',5'-di-t-butyl-4'-hydroxyphenyl)ethane phosphonate is purified further by elution chromatography from a column packed with silica gel and is obtained as a straw-colored viscous oil.

*Example 13.—Diethyl-3,5-di-t-butyl-4-hydroxybenzylphosphonate*

13.3 parts of triethylphosphite (0.08 mole) are added gradually to 26.4 parts of 80.5% 2,6-di-t-butyl-4-chloromethylphenol (0.08 mole) in a nitrogen atmosphere. The reaction is initiated by warming in a bath held at 100° and is accompanied by the evolution of ethyl chloride. After about 30 minutes, the reaction mixture is heated at 150° at 2 mm. Hg pressure. The diethyl-3,5-di-t-butyl-4-hydroxybenzylphosphonate (28 parts) is triturated with petroleum ether to remove colored by-products. After recrystallization from hexane, the diethyl-3,5-di-t-butyl-4-hydroxybenzylphosphonate is obtained as a white crystalline solid melting at 119–121°.

*Example 14.—Dimethyl-3,5-di-t-butyl-4-hydroxybenzylphosphonate*

21.6 parts of trimethylphosphite (0.174 mole) is added gradually to 54 parts of 81.5% 2,6-di-t-butyl-4-chloromethylphenol in a nitrogen atmosphere. The mixture is first warmed to 50° then to 100° whereupon a vigorous exothermic reaction sets in accompanied by evolution of methyl chloride. After approximately 30 minutes 2 parts additional of trimethylphosphite is added and heating continued at 175° for 20 minutes. The product (64.3 parts) becomes solid on cooling and is triturated with hot hexane. Recrystallization from acetone yields a white crystalline solid melting at 156–158°, which is dimethyl-3,5-di-t-butyl-4-hydroxybenzylphosphonate.

*Example 15.—Di-p-t-octylphenyl-3,5-di-t-butyl-4-hydroxybenzylphosphonate*

23.6 parts of methyl-di-p-t-octylphenylphosphite (0.05 mole) is mixed with 12.7 parts of 95% 2,6-di-t-butyl-4-chloromethylphenol (0.05 mole) at 130 to 135° for 2 hours at a nitrogen pressure of 15 mm. Hg. The end of the reaction is demonstrated by the absence of chlorine in the isolated di-p-t-octylphenyl-3-5-di-t-butyl-4-hydroxybenzylphosphonate which is obtained as a glassy yellow product. The di-p-t-octylphenyl-3-5-di-t-butyl-4-hydroxybenzylphosphonate can be purified further to a straw-colored glassy run by elution chromatography from a column packed with silica gel.

*Example 16.—O-n-butyl-3,5-di-t-butyl-4-hydroxybenzylphosphonic acid*

34 parts of di-n-butyl-3,5-di-t-butyl-4-hydroxybenzylphosphonate is dissolved in a solution of 100 parts by volume of methanol and 40 parts by weight of 50% aqueous sodium hydroxide. The homogeneous reaction mixture is heated at 80° for 19 hours. The reaction product is then dispersed in 500 parts by volume of water and extracted with two portions of 100 parts by volume each of diethyl ether. The combined ether extract is back extracted with 300 parts by volume of water. The combined aqueous phase is made acid to pH 1 with about 40 parts by volume of concentrated aqueous hydrochloric acid and extracted with 300 parts by volume of benzene. The benzene extract is dried over anhydrous sodium sulfate, filtered from the drying agent and freed of benzene by distillation at 15 mm. Hg pressure. The O-n-butyl-3,5-di-t-butyl-4-hydroxybenzylphosphonate is a glass.

*Example 17.—Di-n-butyl-3,5-di-t-butyl-4-hydroxybenzylphosphonate*

25.7 parts of 2,6-di-t-butyl-4-chloromethylphenol (0.10 mole) is dissolved in 25 parts of tri-n-butylphosphite at room temperature. The reaction charge warms up spontaneously and butyl chloride starts to distill at a vapor temperature of about 75°. The charge is heated at 150 to 200° at atmospheric pressure whereupon the by-product butylchloride continues to distill at a vapor temperature of about 80°. The light yellow product is then distilled under a nitrogen pressure of 0.10 to 0.20 mm. Hg yielding 35 parts of a light yellow oil boiling at 177–187°. Redistillation yields purified di-n-butyl-3,5-di-t-butyl-4-hydroxybenzylphosphonate boiling at 182–185.5 at 0.15 to 0.20 mm. Hg which slowly solidifies to a pale straw solid melting at 45–48°.

The di-n-butyl-3,5-di-t-butyl-4-hydroxybenzylphosphonate can be purified further by elution chromatography from a column packed with silica gel.

*Example 18.—Di-n-dodecyl-3,5-di-t-butyl-4-hydroxybenzylphosphonate*

25.7 parts of 2,6-di-t-butyl-4-chloromethylphenol (0.10 mole) is dissolved in 58.7 parts of trilaurylphosphite (0.10 mole) and heated together at 210 to 220° for 1 hour under a nitrogen pressure of 20 to 22 mm. Hg during which 16 parts of dodecylchloride is collected at a vapor temperature of 145 to 148°. The product (68 parts) is then dissolved in 100 parts by volume of glacial acetic acid and about 25 grams of zinc slowly added and the whole heated to 60° with stirring, the reddish product becoming light in color. The acetic acid solution is filtered and the filtrate is poured into 300 parts by volume of water, and the oil extracted with about 300 parts by volume of benzene. The benzene is removed by distillation at 15 mm. Hg pressure, the residual oily product, the di-n-dodecy-3,5-di-t-butyl-4-hydroxybenzylphosphonate, weighing 67 parts. 10 parts of the product is further purified by elution chromatography by means of a column packed with silica gel. The di-n-dodecyl-3,5-di-t-butyl-4-hydroxybenzylphosphonate is obtained as a straw-colored oil.

*Example 19.—O-n-decyl-o-phenyl-3,5-di-t-butyl-4-hydroxybenzylphosphonate*

43.8 parts of di-n-decylphenylphosphite (0.10 mole) are mixed with 25 parts of 2,6-di-t-butyl-4-chloromethylphenol in a 3-neck flask fitted for vacuum distillation with a still-head and condenser and capillary bleed for the introduction of nitrogen gas. 13 parts of decylchloride are obtained by distillation at a pot temperature of 173–205° at 15 mm. Hg pressure. The O-n-decyl-O-phenyl-3,5-di-t-butyl-4-hydroxybenzylphosphonate (36 parts) is obtained as a yellow oil distilling at 227–235° at 0.10 to 0.14 mm. Hg pressure. A portion of the product is further purified to remove most of the color by elution chromatography from a column packed with silica gel. The O-n-decyl-O-phenyl-3,5-di-t-butyl-4-hydroxybenzylphosphonate obtained is a straw-colored oil.

*Example 20.—S,S-di-n-octadecyl-3,5-di-t-butyl-4-hydroxybenzyldithiophosphonate*

25.3 parts of O-methyl-S,S-di-n-octadecyldithiophosphite (0.04 mole) is heated together with 10.3 parts of 94% 2,6-di-t-butyl-4-chloromethylphenol (0.04 mole) under 15 mm. Hg nitrogen pressure in a 3-neck flask at a temperature of about 130°. The crude S,S-di-n-octadecyl-3,5-di-t-butyl - 4 - hydroxybenzyldithiophosphonate (34 parts) so obtained is successively triturated with hexane and acetone to wash out colored by-products. After recrystallization from n-hexane S,S-di-n-octadecyl-3,5-di-t-butyl-4-hydroxybenzyldithiophosphonate is obtained as white crystals melting at 68–70°.

*Example 21.—Diphenyl-3,5-di-t-butyl-4-hydroxybenzylphosphonate*

15.8 parts of 80% 2,6-di-t-butyl-4-chloromethylphenol (0.05 mole) is mixed with 18.7 parts of diphenyldecylphosphite and heated together at 185–200° under a nitrogen pressure of 30 to 33 mm. Hg for 1 hour. During this time decylchloride (5.7 parts) distills. The crude diphenyl-3,5-di-t-butyl - 4 - hydroxybenzylphosphonate so obtained is crystallized successively from a solvent mixture of benzene and hexane, from acetone and finally from a solvent mixture of cyclohexane and benzene. The product is obtained as white crystals melting at 133–135°.

*Example 22.—Di-n-octadecyl-3,5-di-t-butyl-4-hydroxybenzylphosphonate*

12.6 parts of 94% 2,6-di-t-butyl-4-chloromethylphenol (0.05 mole) is dissolved in 10 parts by volume of hexane and added to 41.9 parts of tri-n-octadecylphosphite (0.05 mole) in a 3-neck flask fitted for vacuum distillation with a capillary bleed tube through which nitrogen is led and a stillhead and condenser. The charge is kept at 15 mm. Hg nitrogen pressure at room temperature to gradually distill and remove the hexane and then melted together at 110° at 0.5 mm. Hg pressure for 15 minutes; then heated at 150° at 0.2 mm. Hg pressure for 30 minutes. The reaction charge is then heated over a range of 171° to 194° to distill about 12 parts of octadecylchloride at a vapor temperature of about 131 to 133° at 0.15 to 0.18 mm. Hg pressure. The di-n-octadecyl-3,5-di-t-butyl-4-hydroxybenzylphosphonate is a light yellow oil while molten weighing 40 parts. After successive recrystallization from n-hexane and acetone, the di-n-octadecyl-3,5-di-t-butyl-4-hydroxybenzylphosphonate is obtained as a white crystalline solid melting at 55–57°.

Di-n-octadecyl - 3,5 - di-t-butyl - 4-hydroxybenzylphosphonate is also obtained by reacting 2,6-di-t-butyl-4-chloromethylphenol with the sodium derivative of di-n-octadecylphosphite in xylene.

*Example 23.—O-n-octadecyl-(3,5-di-t-butyl-4-hydroxybenzyl)-benzenephosphinate*

5.3 parts of 2,6-di-t-butyl-4-chloromethylphenol (0.02 mole) and 13.4 parts of di-n-octadecylbenzene phosphonite (0.02 mole) are heated together at 130 to 135° at 15 mm. Hg nitrogen pressure for 1¾ hours. The product is then heated at 190–220° for 45 minutes at 0.2 to 0.8 mm. Hg vacuum during which 4.5 parts of liquid distills at a vapor temperature of 125–140°. The residue (13 parts) is dissolved in 125 parts by volume of hot acetonitrile. Benzene (about 25 parts by volume) is gradually added until the precipitated oil becomes a solid at room temperature. The crystalline dispersion is then cooled at 0° and filtered yielding 9 parts of slightly yellow crystalline product. On successive crystallization from acetone, O-n-octadecyl-(3,5-di-t-butyl - 4-hydroxybenzyl)-benzenephosphinate is obtained as white crystals melting at 81–82°.

EXAMPLES—PART III: STABILIZED MATERIAL

*Example 24*

Unstabilized polypropylene powder (50 parts of Hercules Profax 6501) is thoroughly blended with 0.1% by weight of di-n-octadecyl-3,5-di-t-butyl-4-hydroxybenzylphosphonate made according to Example 22. There is also added to this blend 0.5% by weight of DLTDP and 0.5% by weight of TOP. The resulting blended material is then milled on a two roller mill at 182° for 5 minutes, after which time the stabilized polypropylene is sheeted from the mill and allowed to cool.

The milled polypropylene sheet is then cut into small pieces and pressed for 7 minutes on a hydraulic press at 218° and 2000 pounds per square inch pressure. The resultant sheet of 25 mil thickness is then tested for resistance to accelerated aging in a forced draft oven at 149°. The resultant composition of 0.1% by weight of di-n-octadecyl - 3,5 - di - t - butyl - 4 - hydroxybenzylphosphonate, 0.5% of DLTDP, 0.5% of TOP and polypropylene is stabilized against oxidative deterioration and manifests good color value.

In like manner, stable compositions of polypropylene are prepared having a three component stabilizer system with 0.5% DLTDP, 0.5% TOP and 0.1% of one of the following stabilizer compounds:

Di-n-octadecyl-(3-t-butyl-4-hydroxy-5-methylbenzyl)-phosphonate
Di-n-octadecyl-1-(3',5'-di-t-butyl-4'-hydroxyphenyl)-ethanephosphonate
Di-n-octadecyl-3,5-di-t-butyl-2-hydroxybenzylphosphonate
Di-n-dodecyl-2-(3',5'di-t-butyl-4'-hydroxyphenyl)ethane phosphonate
Diethyl-3,5-di-t-butyl-4-hydroxybenzylphosphonate
Dimethyl-3,5-di-t-butyl-4-hydroxybenzylphosphonate
Di-p-t-octylphenyl-3,5-di-t-butyl-4-hydroxybenzylphosphonate
O-n-butyl-3,5-di-t-butyl-4-hydroxybenzylphosphonic acid
Di-n-butyl-3,5-di-t-butyl-4-hydroxybenzlphosphonate
Di-n-dodecyl-3,5-di-t-butyl-4-hydroxybenzylphosphonate
O-n-decyl-O-phenyl-3,5-di-t-butyl-4-hydroxybenzylphosphonate
S,S-Di-n-octadecyl-3,5-di-t-butyl-4-hydroxybenzyldithiophosphonate
Diphenyl-3,5-di-t-butyl-4-hydroxybenzylphosphonate
O-n-octadecyl-(3,5-di-t-butyl-4-hydroxybenzyl)-benzenephosphinate

*Example 25*

Unstabilized polypropylene powder (100 parts of Hercules PROFAX 6501) is blended with a petroleum ether solution of stabilizers to yield a mixture of 1.0% di-n-octadecyl - 3,5 - di - tertiarybutyl - 4 - hydroxybenzylphosphonate, 2.5% DLTDP, 2.5% TOP and polypropylene powder, all of said percent's by weight based on the total composition after removal of the petroleum ether solvent overnight in a vacuum oven at room temperature. To this resulting powdered mixture is added 900 parts of unstabilized polypropylene powder (Hercules PROFAX 6501) and the whole mixture is thoroughly blended to yield a composition containing 0.1% di-n-octadecyl-3,5-di-tertiarybutyl-4-hydroxybenzylphosphonate, 0.25% DLTDP, 0.25% TOP and polypropylene, all of said percent's by weight based on the total composition.

In like manner stable compositions of polypropylene are prepared having 0.25% DLTDP, 0.25% TOP and 0.1% by weight of one of the following compounds:

Di-n-octadecyl-(3-t-butyl-4-hydroxy-5-methylbenzyl)-phosphonate
Di-n-octadecyl-1-(3',5'-di-t-butyl-4'-hydroxyphenyl)-ethane phosphonate
Di-n-octadecyl-3,5-di-t-butyl-2-hydroxybenzylphosphonate
Di-n-dodecyl-2-(3',5'-di-t-butyl-4'-hydroxyphenyl)ethane phosphonate
Diethyl-3,5-di-t-butyl-4-hydroxybenzylphosphonate
Dimethyl-3,5-di-t-butyl-4-hydroxybenzylphosphonate
Di-p-t-octylphenyl-3,5-di-t-butyl-4-hydroxybenzylphosphonate
O-n-butyl-3,5-di-t-butyl-4-hydroxybenzylphosphonic acid
Di-n-butyl-3,5-di-t-butyl-4-hydroxybenzylphosphonate Di-n-dodecyl-3,5-di-t-butyl-4-hydroxybenzylphosphonate
O-n-decyl-O-phenyl-3,5-di-t-butyl-4-hydroxybenzylphosphonate
S,S-di-n-octadecyl-3,5-di-t-butyl-4-hydroxybenzyldithiophosphonate
Diphenyl-3,5-di-t-butyl-4-hydroxybenzylphosphonate
O-n-octadecyl-(3,5-di-t-butyl-4-hydroxybenzyl)benzenephosphinate

Example 26

The following stabilized composition is prepared according to the method described in Example 24:

0.1% di-n-octadecyl-3,5-di-tertiarybutyl-4-hydroxybenzylphosphonate
0.5% DLTDP
99.4% polypropylene (PROFAX 6501)

Example 27

The following stabilized composition is prepared according to the method described in Example 24:

0.1% di-n-octadecyl-3,5-di-tertiarybutyl-4-hydroxybenzylphosphonate
0.5% TOP
99.4% polypropylene (PROFAX 6501)

Example 28

The following stabilized composition is prepared according to the method described in Example 24:

0.1% di-n-octadecyl-3,5-di-tertiarybutyl-4-hydroxybenzylphosphonate
0.5% tri-iso-octylphosphite (B.P. 161°–4°/0.3 mm.)
99.4% polypropylene (PROFAX 6501).

Example 29

The following stabilized composition is prepared according to the method described in Example 24:

0.1% di-n-octadecyl-3,5-di-tertiarybutyl-4-hydroxybenzylphosphonate
0.5% trinonylphenylphosphite (POLYGARD, Naugatuck Chemicals, Div. of U.S. Rubber Co., Naugatuck, Connecticut)
99.4% polypropylene (PROFAX 6501).

Example 30

The following stabilized composition is prepared according to the method described in Example 24:

0.1% di-n-octadecyl-3,5-di-tertiarybutyl-4-hydroxybenzylphosphonate
0.5% trioctadecylthiophosphite (M.P. 53–55°)
99.4% polypropylene (PROFAX 6501).

Example 31

The following stabilized composition is prepared according to the method described in Example 24:

0.1% di-n-octadecyl-3,5-di-tertiarybutyl-4-hydroxybenzylphosphonate
0.5% dilaurylphosphite
99.4% polypropylene (PROFAX 6501).

Example 32

The following stabilized composition is prepared according to the method described in Example 24:

0.1% di-ni-octadecyl-3,5-di-tertiarybutyl-4-hydroxybenzylphosphonate
0.5% trilaurylphosphite
99.4% polypropylene (PROFAX 6501).

What is claimed is:

1. The stabilized composition of matter which comprises normally solid polypropylene and the stabilizer system comprising
   (i) from about 0.05% to about 0.25% of di-n-octadecyl - 3,5 - di-tertiarybutyl - 4 - hydroxybenzylphosphonate, and
   (ii) from about 0.05% to about 1% of trioctadecylphosphite, all of said percents being by weight, based upon the total stabilized composition.

2. The stabilized composition of matter which comprises normally solid polypropylene and the stabilizer system comprising
   (i) from about 0.05% to about 0.25% of di-n-octadecyl - 3,5 - di-tertiarybutyl - 4 - hydroxybenzylphosphonate, and
   (ii) from about 0.05% to about 1% of dilauryl-$\beta$-thiodipropionate, all of said percents being by weight, based upon the total stabilized composition.

3. The stabilized composition of matter which comprises normally solid polypropylene and the stabilizer system comprising
   (i) from about 0.05% to about 0.25% of di-n-octadecyl - 3,5 - di-tertiarybutyl - 4 - hydroxybenzylphosphonate,
   (ii) from about 0.05% to about 1% of trioctadecylphosphite, and
   (iii) from about 0.05% to about 1% of dilauryl-$\beta$-thiodipropionate, all of said percents being by weight, based upon the total stabilized composition.

4. The stabilized composition of matter which comprises normally solid polypropylene and the stabilizer system comprising
   (i) 0.1% di-n-octadecyl-3,5-tertiarybutyl-4-hydroxybenzylphosphonate,
   (ii) 0.25% trioctadecylphosphite, and
   (iii) 0.25% dilauryl-$\beta$-thio-dipropionate, all of said percents being by weight, based upon the total stabilized composition.

5. The stabilized composition of matter which comprises normally solid polypropylene and the stabilizer system comprising
   (i) from about 0.05% to about 0.25% by weight of di - n - octadecyl - 3,5 - di - tertiarybutyl - 4 - hydroxybenzylphosphonate, and
   (ii) from about 0.05% to about 1% by weight of tri-iso-octylphosphite.

6. The stabilized composition of matter which comprises normally solid polypropylene and the stabilizer system comprising
   (i) 0.1% by weight of di-n-octadecyl-3,5-di-tertiarybutyl-4-hydroxybenzylphosphonate, and
   (ii) 0.5% by weight of tri-iso-octylphosphite.

7. The stabilized composition of matter which comprises normally solid polypropylene and the stabilizer system comprising
   (i) from about 0.05% to about 0.25% by weight of di - n - octadecyl - 3,5 - di - tertiarybutyl - 4 - hydroxybenzylphosphonate, and
   (ii) from about 0.05% to about 1% by weight of trinonylphenylphosphite.

8. The stabilized composition of matter which comprises normally solid polypropylene and the stabilizer system comprising
   (i) 0.1% by weight of di-n-octadecyl-3,5-di-tertiarybutyl-4-hydroxybenzylphosphonate, and
   (ii) 0.5% by weight of trinonylphenylphosphite.

9. The stabilized composition of matter which comprises normally solid polypropylene and the stabilizer system comprising
   (i) from about 0.05% to about 0.25% by weight of di - n - octadecyl - 3,5 - di - tertiarybutyl - 4 - hydroxybenzylphosphonate, and
   (ii) from about 0.05% to about 1% by weight of trilaurylphosphite.

10. The stabilized composition of matter which comprises normally solid polypropylene and the stabilizer system comprising
    (i) 0.1% by weight of di-n-octadecyl-3,5-di-tertiarybutyl-4-hydroxybenzylphosphonate, and
    (ii) 0.5% by weight of trilaurylphosphite.

11. The stabilized composition of matter which comprises normally solid polypropylene and the the stabilizer system comprising
   (i) from about 0.05% to about 0.25% by weight of di-n - octadecyl - 3,5-ditertiary butyl-4-hydroxybenzyl-phosphonate, and
   (ii) from about 0.05% to about 1% by weight of trioctadecylthiophosphite.

12. The stabilizer composition of matter which comprises normally solid polypropylene and the stabilizer system comprising
   (i) 0.1% by weight of di-n-octadecyl-3,5-di-tertiary-butyl-4-hydroxybenzylphosphonate, and
   (ii) 0.5% by weight of trioctadecylthiophosphite.

13. The stabilized composition of matter which comprises normally solid polypropylene and the stabilized system comprising
   (i) from about 0.05% to about 0.25% by weight of di-n - octadecyl - 3,5-di-tertiarybutyl-4-hydroxybenzyl-phosphonate, and
   (ii) from about 0.05% to about 1% by weight of dilaurylphosphite.

14. The stabilizer composition of matter which comprises normally solid polypropylene and stabilizer system comprising
   (i) 0.1% by weight of di-n-octadecyl-3,5-di-tertiary-butyl-4-hydroxybenzylphosphonate, and
   (ii) 0.5% by weight of dilaurylphosphite.

15. The stabilized composition of matter which comprises normally solid polypropylene and the stabilizer system comprising
   (i) from about 0.05% to about 0.25% by weight of the substituted phosphorus stabilizer of the formula:

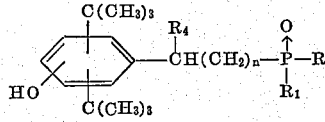

wherein
   R is a member selected from the group consisting of alkylphenoxy having 7 to 24 carbon atoms, alkoxy having 12 to 24 carbon atoms, phenoxy, alkylthio having 12 to 24 carbon atoms and phenyl;
   $R_1$ is a member selected from the group consisting of alkylphenoxy having 7 to 24 carbon atoms, alkoxy having 12 to 24 carbon atoms, phenoxy and alkylthio having 12 to 24 carbon atoms;
   $R_4$ is a member selected from the group consisting of hydrogen and lower alkyl;
   $n$ is a member of the group consisting of 0, 1, 2 and 3, and
   (ii) a member selected from the group consisting of
      (a) from about 0.05% to about 1% by weight of the phosphite stabilizer of the formula:

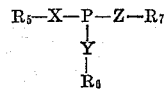

wherein
   X, Y and Z each independently is selected from the group consisting of divalent oxygen and divalent sulfur,
   $R_5$ is a member selected from the group consisting of alkyl having 6 to 24 carbon atoms, alkylphenyl having 7 to 33 carbon atoms, and
   $R_6$ and $R_7$ each independently is selected from the group consisting of alkyl having 6 to 24 carbon atoms, and alkylphenyl having 7 to 33 carbon atoms;
      (b) from about 0.05% to 1% of the thiodiester of the formula:

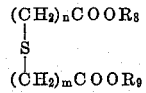

wherein
   $m$ and $n$ are each independently selected from the group consisting of integers from 1 to 6, and
   $R_8$ and $R_9$ each independently represents alkyl having from 6 to 24 carbon atoms, and
      (c) mixtures of (a) with (b), all of the aforesaid percents being by weight, based on the total stabilized composition.

References Cited by the Examiner

UNITED STATES PATENTS

| | | | |
|---|---|---|---|
| 2,824,847 | 2/1958 | Fath | 260—45.7 |
| 2,972,597 | 2/1961 | Newland et al. | 260—45.85 |
| 2,985,617 | 5/1961 | Salyer et al. | 260—45.95 |
| 3,006,945 | 10/1961 | Goddard et al. | 260—45.95 |
| 3,013,003 | 12/1961 | Maragliano et al. | 260—45.95 |

LEON J. BERCOVITZ, *Primary Examiner.*

DONALD E. CZAJA, *Examiner.*

H. E. TAYLOR, *Assistant Examiner.*